US012238396B2

(12) United States Patent
Huang et al.

(10) Patent No.: US 12,238,396 B2
(45) Date of Patent: Feb. 25, 2025

(54) ANTI-TWIST STRUCTURE OF VOICE COIL MOTOR

(71) Applicant: Lanto Electronic Limited, Kunshan (CN)

(72) Inventors: Wen-Yen Huang, Kunshan (CN); Meng-Ting Lin, Kunshan (CN); Fu-Yuan Wu, Kunshan (CN); Shang-Yu Hsu, Kunshan (CN); Bing-Bing Ma, Kunshan (CN); Jie Du, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 368 days.

(21) Appl. No.: 17/326,406

(22) Filed: May 21, 2021

(65) Prior Publication Data

US 2021/0274074 A1 Sep. 2, 2021

(30) Foreign Application Priority Data

Dec. 18, 2020 (CN) .......................... 202023067751.5

(51) Int. Cl.
*G02B 7/09* (2021.01)
*G02B 7/08* (2021.01)
(Continued)

(52) U.S. Cl.
CPC ............... *H04N 23/55* (2023.01); *G02B 7/08* (2013.01); *G02B 7/09* (2013.01); *G03B 3/10* (2013.01);
(Continued)

(58) Field of Classification Search
CPC . G03B 5/00; G03B 5/04; G03B 13/36; G03B 3/10; G03B 3/12; G03B 2205/0007; G03B 2205/0053; G03B 2205/0015; G03B 2205/0069; G03B 3/02; G03B 13/34; G03B 30/00; G02B 7/021; G02B 7/04; G02B 7/08; G02B 7/09; G02B 7/10; G02B 9/62; G02B 13/001; G02B 13/0065; G02B 27/646; H04N 5/2253; H04N 5/2254;
(Continued)

(56) References Cited

U.S. PATENT DOCUMENTS

2012/0146432 A1* 6/2012 Kim .................. G03B 3/10
310/12.16
2012/0300322 A1* 11/2012 Takashima ............... G02B 7/08
359/825

FOREIGN PATENT DOCUMENTS

CN 206020785 U 3/2017
CN 207114854 U 3/2018

* cited by examiner

*Primary Examiner* — Marin Pichler
(74) *Attorney, Agent, or Firm* — Birch, Stewart, Kolasch & Birch, LLP

(57) ABSTRACT

An anti-twist structure of a voice coil motor includes a base, a lens housing, a first elastic sheet, a second elastic sheet, a magnet, and a yoke member. The lens housing has first margin wall and a second margin wall, and a first protrusion extends from the first margin wall. The yoke member has a first wall, a connection wall, a second wall, and a side wall. The first wall is disposed above the first protrusion, and the second wall is above the first margin wall. The lens housing has a deflectable angle relative to a horizontal reference line. When the lens housing deflects to a maximum value of the deflectable angle, the first margin wall abuts against the second wall and/or the first protrusion abuts against the first wall.

10 Claims, 5 Drawing Sheets

(51) Int. Cl.
*G03B 3/10* (2021.01)
*H02K 41/035* (2006.01)
*H04N 5/225* (2006.01)
*H04N 5/232* (2006.01)
*H04N 23/55* (2023.01)
*H04N 23/57* (2023.01)
*H04N 23/69* (2023.01)

(52) U.S. Cl.
CPC ......... *H02K 41/0354* (2013.01); *H04N 23/57* (2023.01); *H04N 23/69* (2023.01); *G03B 2205/0069* (2013.01)

(58) Field of Classification Search
CPC .. H04N 5/2257; H04N 5/23287; H02K 11/33; H02K 41/0356
USPC ....... 359/911, 554, 555, 557, 811, 813, 814, 359/823, 824, 872, 877
See application file for complete search history.

ANTI-TWIST STRUCTURE OF VOICE COIL MOTOR

CROSS-REFERENCE TO RELATED APPLICATION

This non-provisional application claims priority under 35 U.S.C. § 119(a) to Patent Application No. 202023067751.5 filed in China, P.R.C. on Dec. 18, 2020, the entire contents of which are hereby incorporated by reference.

BACKGROUND

Technical Field

The present disclosure relates to a field of optical lenses, and more specifically relates to an anti-twist structure of voice coil motor.

Related Art

Almost all current smart mobile devices are equipped with lens modules. Miniaturizing the lens module and driving the lens of the lens module to elevate or to zoom in/out are mainly achieved through a voice coil motor.

A voice coil motor generally includes a lens housing, a voice coil, a magnet, and a yoke member. Through receiving electrical signals by the voice coil, the voice coil interacts with the magnet, thereby driving the lens to move. However, when the lens is moving, such as when the lens is moving forward/backward in the Z direction, the lens may still be subjected to external forces or component forces caused by its own weight in other directions different from the Z direction. This results in deflections of the lens and the lens housing, for example, the lens and the lens housing may move towards the X direction or the Y direction.

When the lens housing is excessively deflected, the entire lens module may be stuck and cannot be moved upward/downward. Though a slight deflection will not affect the elevating function of the lens module, in a long-term perspective, the friction between the lens housing and the yoke member due to the deflection of the lens housing will produce abrasion debris, which can easily cause clogging and pollution problems, and even affect the operation of the lens module or the quality of image-capturing.

SUMMARY

In order to solve the technical problem(s) mentioned above, the present disclosure attempts to provide an anti-twist structure of voice coil motor. The anti-twist structure of voice coil motor includes a base, a lens housing, a first elastic sheet, a second elastic sheet, a magnet, and a yoke member. The lens housing is connected to the base, and the lens housing has a first margin wall and a second margin wall. The first margin wall is located opposite to the second margin wall. A first protrusion extends from the first margin wall. The first elastic sheet has a hollowed slot, and the first protrusion passes through the hollowed slot so that a portion of the first elastic sheet is disposed on the first margin wall. A portion of the second elastic sheet is disposed on the second margin wall. The magnet is disposed on the base and at one side of the lens housing, and two opposite sides of the magnet respectively abut against the first elastic sheet and the second elastic sheet.

The yoke member has a first wall, a connection wall, a second wall, and a side wall. The connection wall extends outward from one side of the first wall in a direction perpendicular to the first wall. The second wall extends outward from one side of the connection wall, and the second wall is parallel to the first wall. The side wall extends outward from one side of the second wall, and the side wall is parallel to the connection wall. The side wall is connected to the base so that the yoke member surrounds the lens housing, the first elastic sheet, the second elastic sheet, and the magnet. The first wall is disposed above the first protrusion, and the second wall is above the first margin wall. The lens housing has a deflectable angle relative to a horizontal reference line, and the deflectable angle is an included angle between the lens housing and the horizontal reference line. When the lens housing deflects to a maximum value of the deflectable angle, the first margin wall abuts against the second wall or the first protrusion abuts against the first wall, or both the first margin wall abuts against the second wall and the first protrusion abuts against the first wall, so that the lens housing and the yoke member interfere with each other.

In some embodiments, a distance between an inner surface of the first wall and the first protrusion is less than a distance between the first elastic sheet and the first margin wall. More specifically, in some embodiments, the distance between the first wall and the first protrusion is 0.14 mm to 0.16 mm, and the distance between the first elastic sheet and the first margin wall is 0.16 mm to 0.18 mm.

In some embodiments, the deflectable angle is not greater than 2.9 degrees.

In some embodiments, the first margin wall further includes an inner flange, and a groove is between the inner flange and the first protrusion, and an extension arm of the first elastic sheet is disposed in the groove. More specifically, two ends of the extension arm are connected to two limiting section, respectively, and a width of each of the two limiting sections is greater than a width of the extension arm. The first protrusion is disposed between the two limiting sections.

Furthermore, in some embodiments, the first elastic sheet includes an abutting section and a clamp section. The clamp section is above the voice coil, and the abutting section is connected to the clamp section and one of the two limiting sections. The abutting section is on the magnet.

Furthermore, in some embodiments, the hollowed slot is between the clamp section and the extension arm.

Furthermore, in some embodiments, a width of the abutting section is greater than a width of the clamp section, and a width of the extension arm is less than a width of the clamp section.

In some embodiments, the second elastic sheet comprises an assembling section, a connection section, and an extension section. The assembling section is disposed along the second margin wall, and the assembling section is positioned on the second margin wall. The connection section is connected between the assembling section and the extension section, and the extension section extends from the connection section. More specifically, in some embodiments, the second margin wall has a protruding edge, and the assembling section is disposed along the protruding edge and positioned on the protruding edge.

Furthermore, in some embodiments, the second elastic sheet includes two elastic components. The two elastic components are separated from each other and are symmetrically arranged on the second margin wall around a central axis of the lens housing. More specifically, in some embodiments, the second margin wall further includes a bump protruding from the protruding edge, and the two elastic components are respectively positioned at two sides of the bump.

To sum up, according to one or some embodiments of the present disclosure, the lens housing of the anti-twist structure has the first protrusion, and the yoke member of the anti-twist structure has a stepped structure on its upper portion. Therefore, when the lens housing deflects to the maximum value of the deflectable angle θ, the first margin wall abuts against the second wall and/or the first protrusion abuts against the first wall, so that the lens housing and the yoke member interfere with each other. Thus, the effect that limiting the elevation of the lens or limiting the deflectable angle θ of the lens when the lens housing is subjected to an external force can be achieved. Moreover, according to one or some embodiments of the present disclosure, with the first elastic sheet and the second elastic sheet, the lens housing can be quickly moved resiliently to its original position when a small-angle deflection occurs, thereby ensuring the service life of the overall lens module.

BRIEF DESCRIPTION OF THE DRAWINGS

The disclosure will become more fully understood from the detailed description given herein below for illustration only, and thus not limitative of the disclosure, wherein.

DETAILED DESCRIPTION

Hereinafter, the principle of structures and the principle of operation of the present disclosure will be described more fully with reference to the accompanying drawings.

Figure 1:
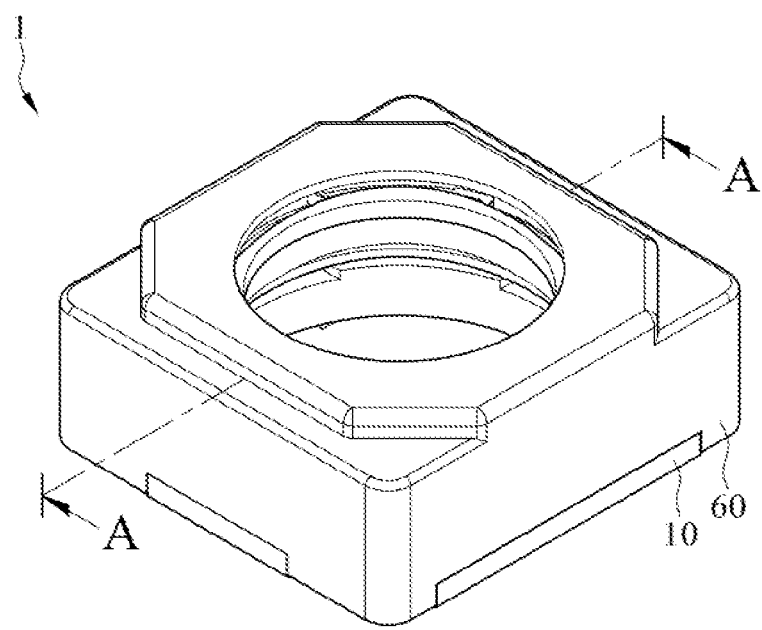
FIG. 1 illustrates a schematic perspective view of an anti-twist structure of voice coil motor according to the exemplary embodiment of the present disclosure.
Figure 2:
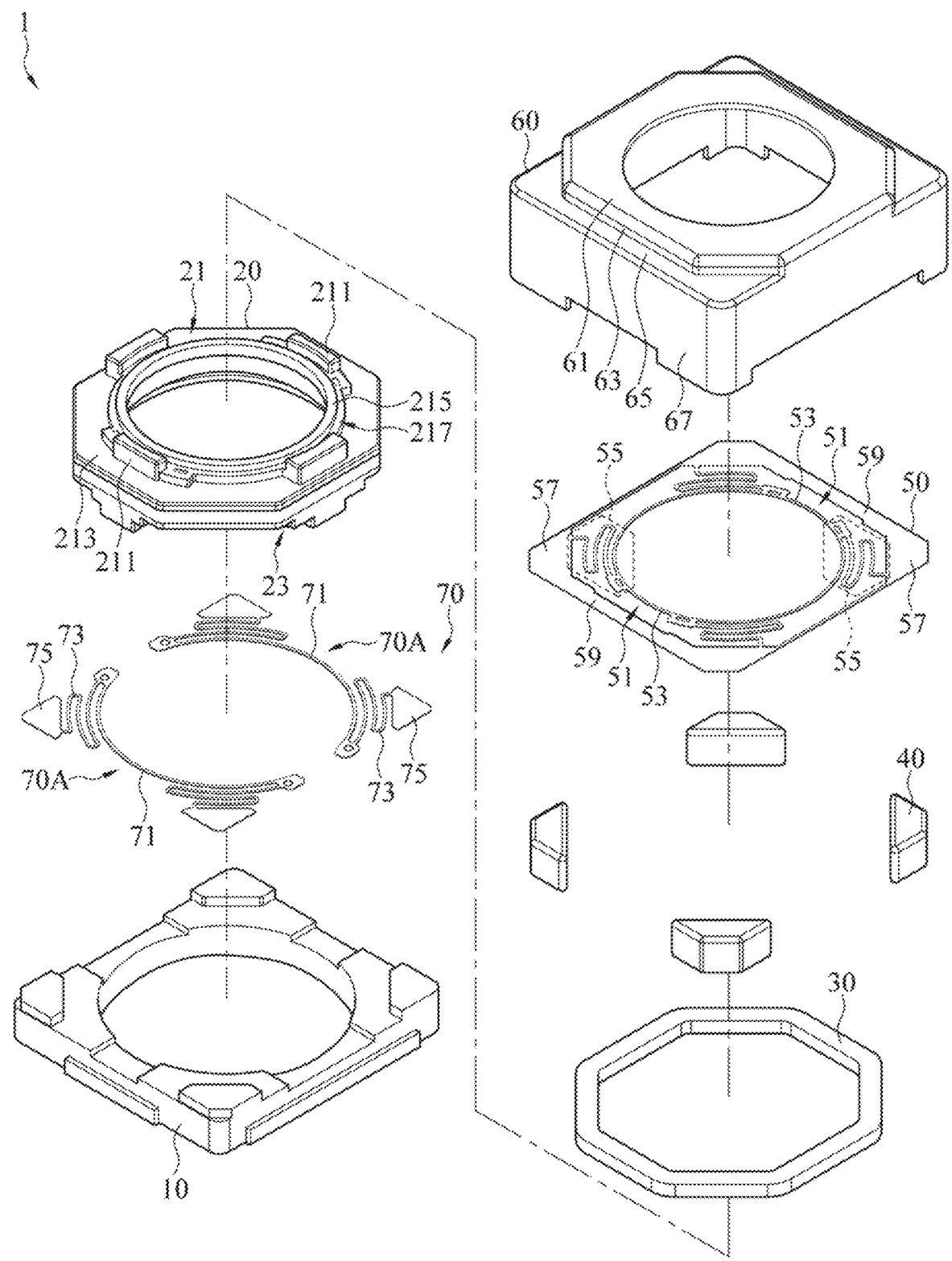
FIG. 2 illustrates a schematic exploded view of the anti-twist structure of voice coil motor according to the exemplary embodiment of the present disclosure.
Figure 3:
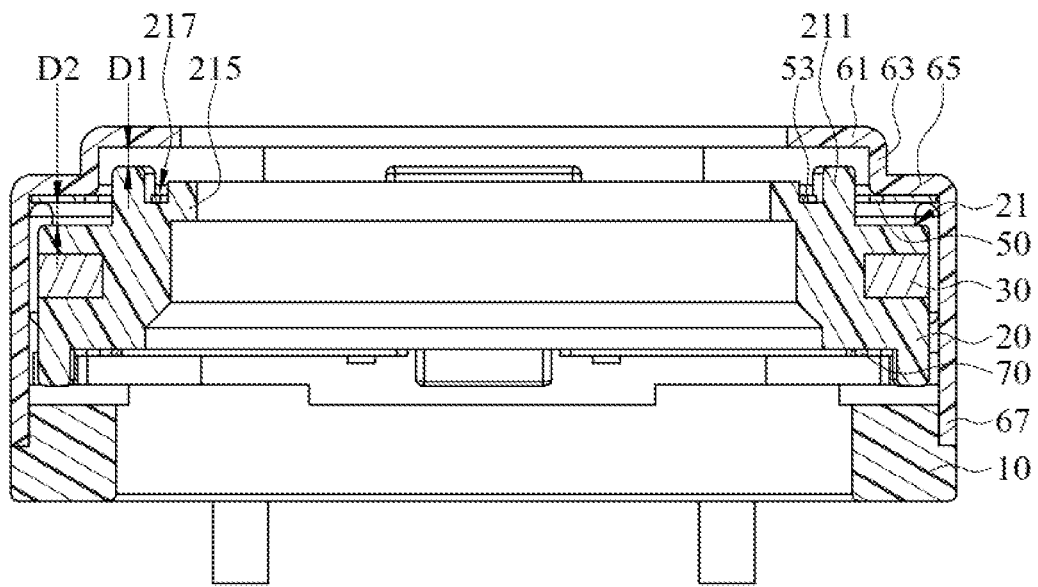
FIG. 3 illustrates a schematic cross-sectional view of the anti-twist structure of voice coil motor according to the exemplary embodiment of the present disclosure.

FIG. 1 illustrates a schematic perspective view of an anti-twist structure 1 of voice coil motor according to the exemplary embodiment of the present disclosure. FIG. 2 illustrates a schematic exploded view of the anti-twist structure 1 of voice coil motor according to the exemplary embodiment of the present disclosure. FIG. 3 illustrates a schematic cross-sectional view of the anti-twist structure 1 of voice coil motor according to the exemplary embodiment of the present disclosure. As shown in FIG. 1 to FIG. 3, the anti-twist structure 1 of voice coil motor includes a base 10, a lens housing 20, a voice coil 30, a magnet 40, a first elastic sheet 50, a yoke member 60, and a second elastic sheet 70. The lens housing 20 is connected to the base 10. The lens housing 20 a first margin wall 21 and a second margin wall 23. The first margin wall 21 is located opposite to the second margin wall 23. A first protrusion 211 extends from the first margin wall 21. The first margin wall 21 further comprises a periphery contact portion 213, which is extending outwardly from an outer periphery of the first protrusion 211. The periphery contact portion 213 is substantially perpendicular to the first protrusion 211. In the other words, the normal direction of the periphery contact portion 213 is substantially parallel to the extending direction of the first protrusion 211. The voice coil 30 is disposed on the outer edge of the lens housing 20. The magnet 40 is disposed on the base 10, located at one side of the lens housing 20, and not in contact with the voice coil 30.

The first elastic sheet 50 has a hollowed slot 51. The first protrusion 211 passes through the hollowed slot 51 so that a portion of the first elastic sheet 50 is disposed on the first margin wall 21. A portion of the second elastic sheet 70 is disposed on the second margin wall 23. Two opposite sides of the magnet 40 respectively abut against the first elastic sheet 50 and the second elastic sheet 70.

The yoke member 60 includes a first wall 61, a connection wall 63, a second wall 65, and a side wall 67. The connection wall 63 extends outward from one side of the first wall 61 in a direction perpendicular to the first wall 61. The second wall 65 extends outward from one side of the connection wall 63, and the second wall 65 is parallel to the first wall 61. Therefore, a stepped structure is formed on the upper portion of the yoke member 60. The stepped structure can be formed by a stamping process. The side wall 67 extends outward from one side of the second wall 65, is parallel to the connection wall 63, and is connected to the base 10. Accordingly, the yoke member 60 surrounds the lens housing 20, the voice coil 30, the magnet 40, the first elastic sheet 50, and the second elastic sheet 70. In this embodiment, the first wall 61 is disposed above the first protrusion 211, and the second wall 65 is above the first margin wall 21.

For the convenience of presentation, the stepped structure on the upper portion of the yoke member 60 and the structure of the first elastic sheet 50 in FIG. 1 to FIG. 3 are presented in a bilaterally symmetrical manner. However, it can be understood that, since the yoke member 60 can be formed by stamping, the stepped structure may be formed on only one side of the upper portion of the yoke member 60 or may be formed on several sides of the upper portion of the yoke member 60. Moreover, the term "deflection" mentioned above refers to the state that the lens housing 20 is deflected toward the yoke member 60.

Figure 4:
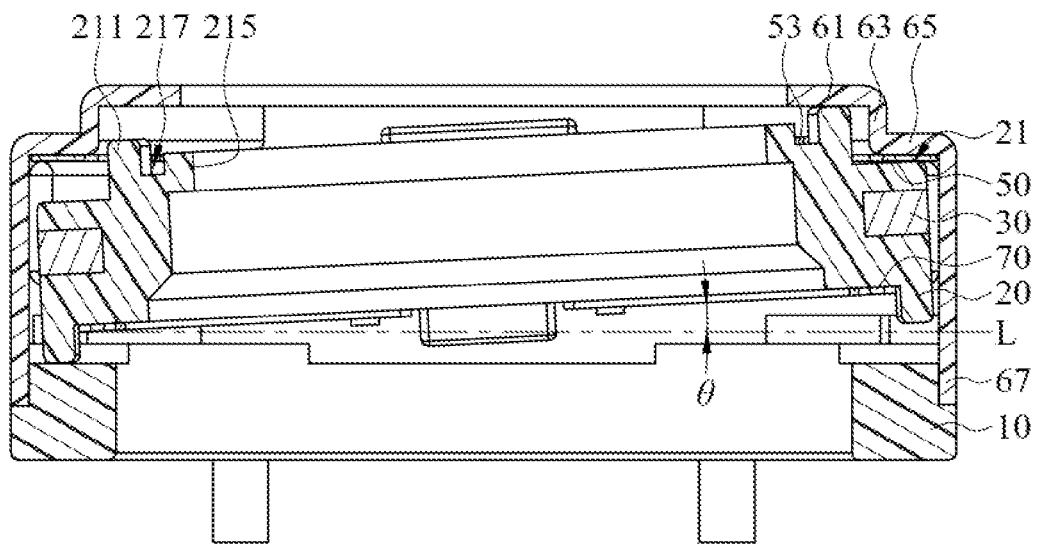
FIG. 4 illustrates a schematic cross-sectional view of the anti-twist structure of voice coil motor according to the exemplary embodiment where the lens housing is in a deflected state.

FIG. 4 illustrates a schematic cross-sectional view of the anti-twist structure 1 of voice coil motor according to the exemplary embodiment where the lens housing 20 is in a deflected state. As shown in FIG. 4, and please also refer to FIG. 3 at the same time, the lens housing 20 has a deflectable angle θ relative to the horizontal reference line L. The deflectable angle θ is the included angle between the lens housing 20 and the horizontal reference line L. When the lens housing 20 deflects from the horizontal reference line L to the maximum value of the deflectable angle θ, three conditions may occur. In a first condition, only the first protrusion 211 abuts against the first wall 61. In a second condition, only the periphery contact portion 213 of the first margin wall 21 abuts against the second wall 65 through the first elastic sheet 50. In a third condition, at the same time, the first protrusion 211 abuts against the first wall 61, and the periphery contact portion 213 of the first margin wall 21 abuts against the second wall 65 through the first elastic sheet 50. In other words, in one or some embodiments, when the lens housing 20 deflects from the horizontal reference line L to the maximum value of the deflectable angle θ, the first margin wall 21 abuts against the second wall 65 and/or the first protrusion 211 abuts against the first wall 61. Consequently, the lens housing 20 and the yoke member 60 interfere with each other, so that the range of the deflectable angle θ of the lens housing 20 can be limited, thereby achieving the anti-twist effect for the voice coil motor. Generally, the deflectable angle θ may be 1 degree to 3.2 degrees, more preferably, in one or some embodiments, not greater than 2.9 degrees.

In order to achieve the interference effect between the lens housing 20 and the yoke member 60, the distances between the lens housing 20 and the yoke member 60 can be adjusted. For example, the distance D1 between the inner surface of the first wall 61 and the first protrusion 211 is less than the distance D2 between the first elastic sheet 50 and the first margin wall 21. More specifically, in some embodiments, the distance between the first protrusion 211 and the first wall 61 is 0.14 mm to 0.16 mm, preferably in one or some embodiments, 0.148 mm to 0.154 mm. The distance between the first elastic sheet 50 and the first margin wall 21 is 0.16 mm to 0.18 mm, preferably in one or some embodiments, 0.162 mm to 0.168 mm.

Figure 5:
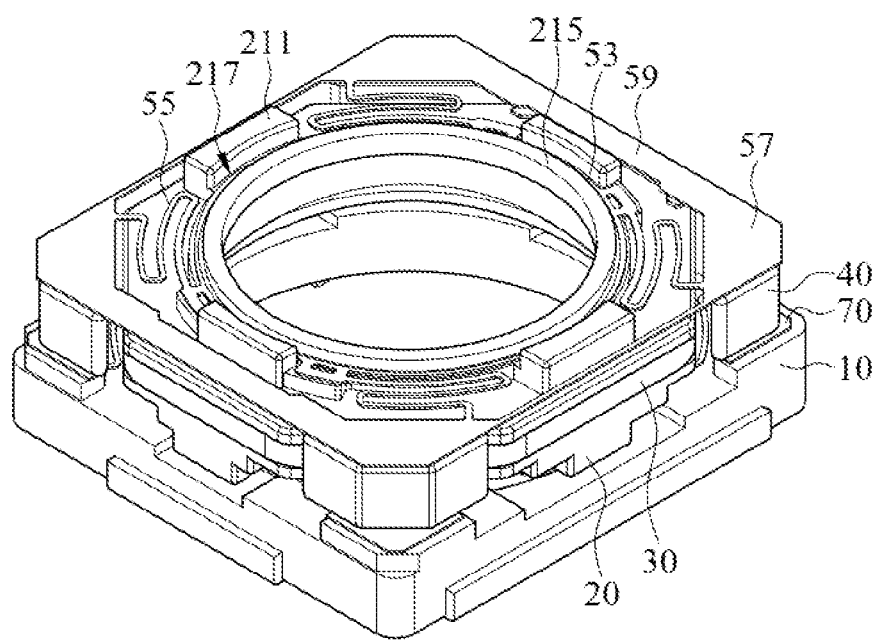
FIG. 5 illustrates a schematic perspective view of the lens housing and the first elastic sheet according to the exemplary embodiment of the present disclosure.
Figure 6:
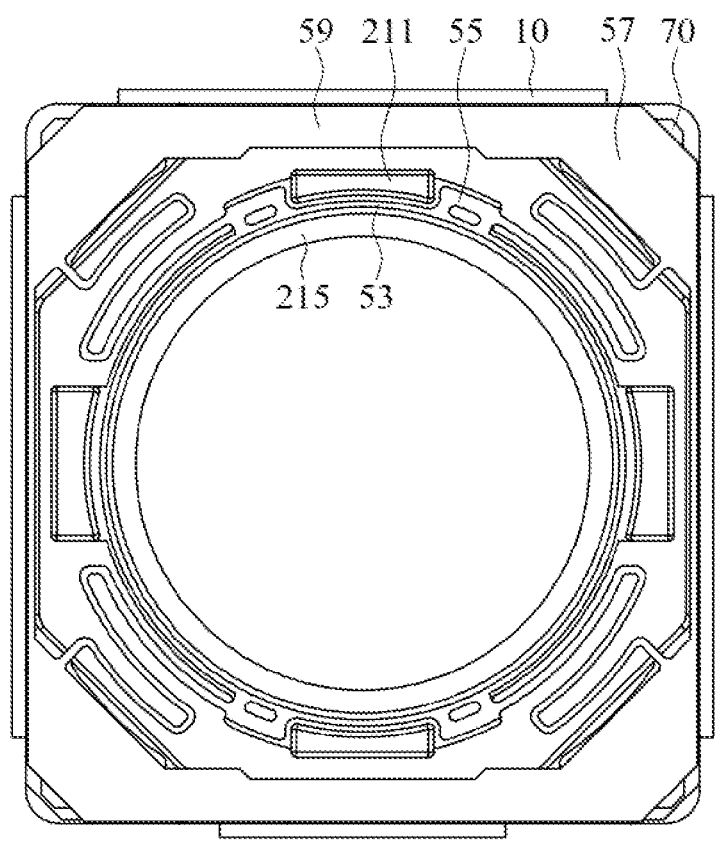
FIG. 6 illustrates a schematic partial top view of the anti-twist structure of voice coil motor according to the exemplary embodiment of the present disclosure.

FIG. 5 illustrates a schematic perspective view of the lens housing 20 and the first elastic sheet 50 according to the exemplary embodiment of the present disclosure. FIG. 6 illustrates a schematic partial top view of the anti-twist structure 1 of voice coil motor according to the exemplary embodiment of the present disclosure. As shown in FIG. 5 and FIG. 6, and please refer to FIG. 2 at the same time, the first margin wall 21 further includes an inner flange 215. A groove 217 is between the inner flange 215 and the first protrusion 211. An extension arm 53 of the first elastic sheet 50 is disposed in the groove 217. Specifically, in one or some embodiments, two ends of the extension arm 53 are respectively connected to the limiting section 55. The width of each of the two limiting sections 55 is greater than the width of the extension arm 53, and the first protrusion 211 is disposed between the two limiting sections 55. Therefore, through the interference among the first protrusion 211, the groove 217, the extension arm 53, and the limiting section 55, the position of the first elastic sheet 50 can be limited, thereby preventing the first elastic sheet 50 from detaching off the lens housing 20.

Furthermore, in one or some embodiments, the first elastic sheet 50 includes an abutting section 57 and a clamp section 59. The clamp section 59 is above the voice coil 30. The abutting section 57 is connected to the clamp section 59 and the limiting section 55. The abutting section 57 is on the magnet 40. More specifically, in one or some embodiments, the hollowed slot 51 is between the clamp section 59 and the extension arm 53. Furthermore, the width of the abutting section 57 is greater than the width of the clamp section 59, and the width of the extension arm 53 is less than the width of the clamp section 59. Moreover, the area of the abutting section 57 is greater than the area of the corresponding magnet 40. That is, a portion of the abutting section 57 is exposed from the magnet 40.

In other words, allowing the clamp section 59 and the limiting section 55 to have larger widths provides the lens housing 20 with a better anti-twist effect and helps to prevent the first elastic sheet 50 from breaking when the voice coil motor is subjected to excessive an external force, thereby maintaining the elasticity of the first elastic sheet 50 and providing the lens housing 20 with a elastic force to move resiliently to its original position when lens housing 20 deflects.

Figure 7:
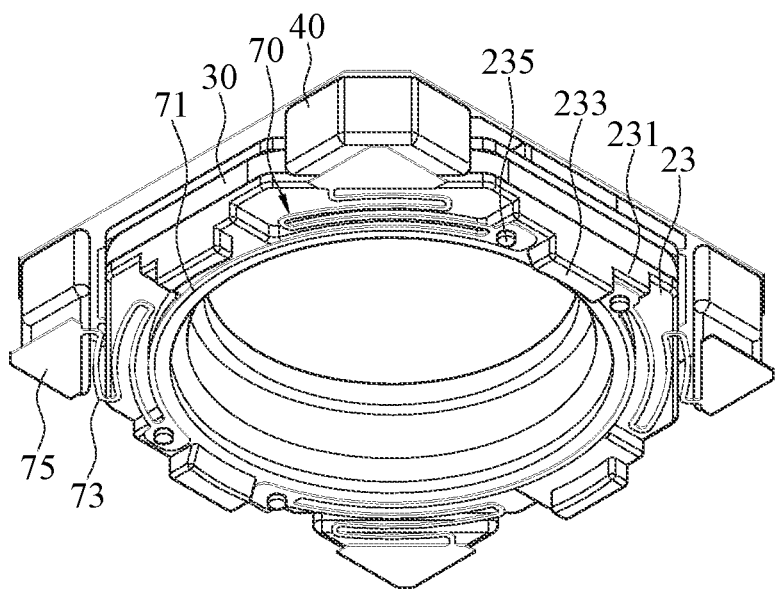
FIG. 7 illustrates a schematic perspective view of the lens housing and the second elastic sheet according to the exemplary embodiment of the present disclosure.
Figure 8:
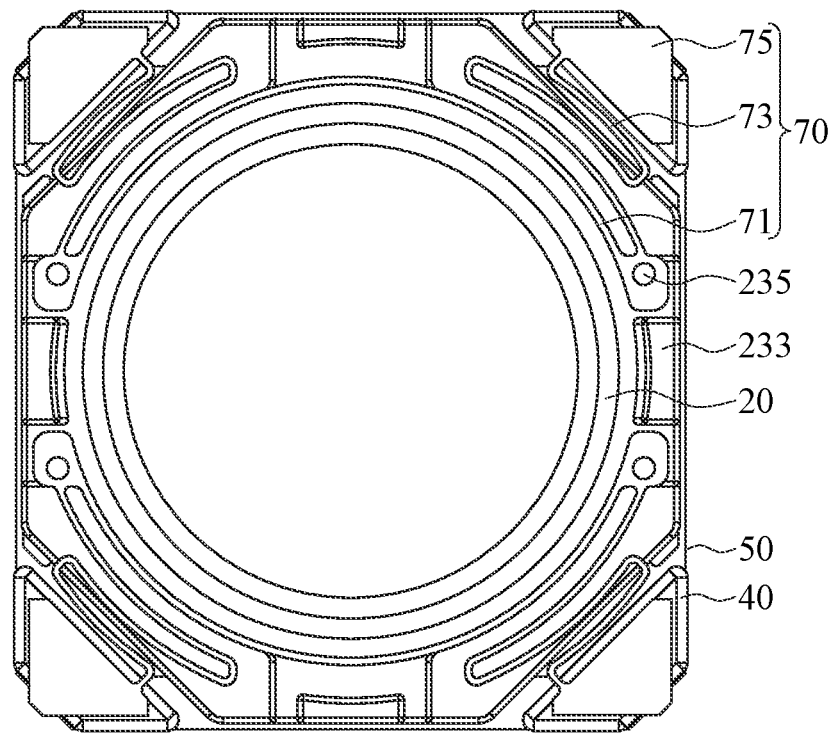
FIG. 8 illustrates a schematic partial bottom view of the anti-twist structure of voice coil motor according to the exemplary embodiment of the present disclosure.

FIG. 7 illustrates a schematic perspective view of the lens housing 20 and the second elastic sheet 70 according to the exemplary embodiment of the present disclosure. FIG. 8 illustrates a schematic partial bottom view of the anti-twist structure 1 of voice coil motor according to the exemplary embodiment of the present disclosure. As shown in FIG. 7 and FIG. 8, and please refer to FIG. 2 at the same time, the second elastic sheet 70 includes an assembling section 71, a connection section 73, and an extension section 75. The assembling section 71 is disposed along the second margin wall 23, and the assembling section 71 is positioned on the second margin wall 23. The connection section 73 is connected between the assembling section 71 and the extension section 75. The extension section 75 extends from the connection section 73, and the extension section 75 is attached to one side of the magnet 40.

In some embodiments, the second margin wall 23 has a protruding edge 231. The assembling section 71 is disposed along the protruding edge 231 and is positioned on the protruding edge 231. More specifically, in some embodiments, the second elastic sheet 70 includes two elastic components 70A. The two elastic components 70A are separated from each other and are symmetrically arranged on the second margin wall 23 around the central axis of the lens housing 20. Moreover, the second margin wall 23 further includes a bump 233. The bump 233 protrudes from the protruding edge 231. The two elastic components 70A are respectively positioned at two sides of the bump 233. In this embodiment, openings may be provided on both sides of the bump 233, and the two elastic components 70A may be fixedly positioned in the openings by the fixing members 235. However, this arrangement is only provided as an example, not a limitation. For example, each of the two elastic components 70A may also have a tenon to be directly inserted into the corresponding opening for fixing. In some other embodiments, the fixing member 235 may also be a protruding fixing pin, which can be directly sleeved in the fixing hole of the assembling section 71. The second elastic sheet 70 disposed on the other side of the lens housing 20 opposite to the first elastic sheet 50 can also provide the elastic force for the lens housing 20 to move resiliently to its original position when the lens housing 20 deflects.

To sum up, according to one or some embodiments of the instant disclosure, the lens housing 20 of the anti-twist structure 1 of voice coil motor has the first protrusion 211, and the yoke member 60 of the anti-twist structure 1 of voice coil motor has a stepped structure on its upper portion. Therefore, when the lens housing 20 deflects to the maximum value of the deflectable angle θ, the first margin wall 21 abuts against the second wall 65 and/or the first protrusion 211 abuts against the first wall 61 so that the lens housing 20 and the yoke member 60 interfere with each other. Thus, the effect that limiting the elevation of the lens or limiting the deflectable angle θ of the lens when the lens housing is subjected to an external force can be achieved. Moreover, according to one or some embodiments of the present disclosure, with the first elastic sheet 50 and the second elastic sheet 70, the lens housing 20 can be quickly moved resiliently to its original position when a small-angle deflection occurs, thereby ensuring the service life of the overall lens module.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An anti-twist structure of voice coil motor, comprising:
a base;
a lens housing connected to the base, wherein the lens housing has a first margin wall and a second margin wall, and the first margin wall is located opposite to the second margin wall, wherein a first protrusion extends from the first margin wall, wherein the first margin wall further comprises an inner flange and a periphery contact portion, a groove is between the inner flange and the first protrusion, the periphery contact portion is extending outwardly from an outer periphery of the first protrusion, and substantially perpendicular to the first protrusion;
a first elastic sheet having a hollowed slot and an extension arm, wherein the first protrusion passes through the hollowed slot so that a portion of the first elastic sheet is disposed on the first margin wall and the extension arm is disposed in the groove, and two ends of the extension arm are connected to two limiting section, respectively, and wherein a width of each of the two limiting sections is greater than a width of the extension arm, and wherein the first protrusion is disposed between the two limiting sections;
a second elastic sheet, wherein a portion of the second elastic sheet is disposed on the second margin wall;
a magnet disposed on the base and at one side of the lens housing, wherein two opposite sides of the magnet respectively abut against the first elastic sheet and the second elastic sheet;
a voice coil disposed on the outer edge of the lens housing; and
a yoke member having a first wall, a connection wall, a second wall, and a side wall, wherein the connection wall extends outward from one side of the first wall in a direction perpendicular to the first wall; the second wall extends outward from one side of the connection wall, and the second wall is parallel to the first wall; the side wall extends outward from one side of the second wall, and the side wall is parallel to the connection wall; the side wall is connected to the base so that the yoke member surrounds the lens housing, the first elastic sheet, the second elastic sheet, and the magnet; the first wall is disposed above the first protrusion; and the second wall is disposed above the periphery contact portion of the first margin wall;

wherein the lens housing has a deflectable angle relative to a horizontal reference line, and the deflectable angle is an included angle between the lens housing and the horizontal reference line, and wherein when the lens housing deflects to a maximum value of the deflectable angle, the periphery contact portion of the first margin wall abuts against the second wall and the first protrusion abuts against the first wall, so that the lens housing and the yoke member interfere with each other.

2. The anti-twist structure of voice coil motor according to claim 1, wherein the distance between the inner surface of the first wall and the first protrusion is 0.14 mm to 0.16 mm, and the distance between the first elastic sheet and the first margin wall is 0.16 mm to 0.18 mm.

3. The anti-twist structure of voice coil motor according to claim 1, wherein the deflectable angle is not greater than 2.9 degrees.

4. The anti-twist structure of voice coil motor according to claim 1, wherein the first elastic sheet comprises an abutting section and a clamp section, wherein the clamp section is disposed on the first margin wall, and the abutting section is connected to the clamp section and one of the two limiting sections, and wherein the abutting section is disposed on the magnet, and parts of a vertical projection of the abutting section overlaps a vertical projection of the magnet.

5. The anti-twist structure of voice coil motor according to claim 4, wherein the hollowed slot is between the clamp section and the extension arm.

6. The anti-twist structure of voice coil motor according to claim 4, wherein a width of the abutting section is greater than a width of the clamp section, and the width of the extension arm is less than a width of the clamp section.

7. The anti-twist structure of voice coil motor according to claim 1, wherein the second elastic sheet comprises an assembling section, a connection section, and an extension section, wherein the assembling section is disposed along the second margin wall, and the assembling section is positioned on the second margin wall, wherein the connection section is connected between the assembling section and the extension section, wherein the extension section extends from the connection section.

8. The anti-twist structure of voice coil motor according to claim 7, wherein the second margin wall has a protruding edge, and the assembling section is disposed along the protruding edge and positioned on the protruding edge.

9. The anti-twist structure of voice coil motor according to claim 8, wherein the second elastic sheet comprises two elastic components, wherein the two elastic components are separated from each other and are symmetrically arranged on the second margin wall around a central axis of the lens housing.

10. The anti-twist structure of voice coil motor according to claim 9, wherein the second margin wall further comprises a bump protruding from the protruding edge, wherein the two elastic components are respectively positioned at two sides of the bump.

\* \* \* \* \*